(12) United States Patent
Ruckman et al.

(10) Patent No.: US 6,473,298 B1
(45) Date of Patent: Oct. 29, 2002

(54) PERIPHERAL DEVICE STORAGE SYSTEM

(75) Inventors: William W. Ruckman, San Jose, CA (US); David K. J. Kim, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 83 days.

(21) Appl. No.: 09/651,617

(22) Filed: Aug. 30, 2000

(51) Int. Cl.$^7$ .................................................. H05K 5/00
(52) U.S. Cl. ........................ 361/685; 361/683; 361/684; 312/223.1; 312/223.2; 439/53; 439/928.1
(58) Field of Search ................................. 361/685, 683, 361/684, 686, 724–727, 807, 809; 312/223.1, 223.2; 228/65, 73, 535, 534, 27.3; 439/53, 152, 157, 928.1

(56) References Cited

U.S. PATENT DOCUMENTS

| | | | | |
|---|---|---|---|---|
| 4,941,841 A | * | 7/1990 | Darden et al. .............. 439/377 |
| 5,172,305 A | * | 12/1992 | DeWilde ..................... 361/796 |
| 5,587,879 A | * | 12/1996 | Spano et al. ................. 361/785 |
| 5,774,337 A | * | 6/1998 | Lee et al. .................... 361/725 |
| 5,808,864 A | * | 9/1998 | Jung ........................... 361/685 |
| 5,995,364 A | * | 11/1999 | McAnally et al. .......... 361/685 |
| 6,058,016 A | * | 5/2000 | Anderson et al. ........... 361/727 |
| 6,069,789 A | * | 5/2000 | Jung ........................... 361/684 |
| 6,188,571 B1 | * | 2/2001 | Roganti et al. ............. 361/685 |

* cited by examiner

Primary Examiner—Darren Schuberg
Assistant Examiner—David Foster
(74) Attorney, Agent, or Firm—Rosenthal & Osha L.L.P.

(57) ABSTRACT

An apparatus is disclosed for storing electronic devices. The apparatus includes an enclosure, a carrier adapted to contain a peripheral device, and a rotatable attachment between the carrier and the enclosure. The carrier may be rotated from an installed position to an open position. When in the installed position, a long axis of the carrier is substantially parallel to a front of the enclosure. When in the open position, the long axis of the carrier is substantially perpendicular to the front of the enclosure.

27 Claims, 3 Drawing Sheets

PERIPHERAL DEVICE STORAGE SYSTEM

BACKGROUND OF THE INVENTION

Conventional computer systems are composed of a variety of components. For example, the computer system may include internal devices such as a central processing unit ("CPU") for the processing of data, at least one bus for the transmission of data, and random access memory ("RAM") for the storage of data. Additionally, typical systems may include external, or peripheral devices such as floppy disk drives and CD-ROM drives.

A typical desktop or workstation PC may include, as an internal or an external component, a hard disk drive. Hard disk drives are typically high capacity storage devices that serve as the primary memory storage component of the computer system. Generally, in a PC, at least one hard disk is contained internally in a desktop or "tower" case.

Another type of computer system is a network system that includes the use of servers. There are several types of servers, including file servers that are typically dedicated to storing information, network servers that manage traffic on a computer network, and print servers that manage one or more printers. Server systems typically also include at least one hard disk drive for memory storage. However, some server systems may include a large number of external, or peripheral, hard disk drives, especially systems such as file servers that store large quantities of data. The physical configurations of these server systems poses a problem because of the large number of peripheral drives. The peripheral drives occupy large amounts of floor space and may create problems with the space availability in home and/or offices where the server systems are located.

In recent years, computer system manufacturers have taken steps to reduce the overall system space requirements for their products. Because of the desire for smaller systems, attempts have been made to increase the storage capacity of peripheral drives so that fewer drives are required. However, the storage capacity of peripheral devices is limited by current technology. Therefore, large numbers of peripheral devices are often required and are typically stored in peripheral enclosures that may occupy a considerable amount of floor space.

As an example, computer equipment may be mounted in racks as shown in prior art FIG. 1. The rack mounted computer equipment 10 may include hardware such as hard disk drives 12 that are accessible from a front 13 of a rack 14. The hard disk drives 12 are typically mounted with a long axis L1 of the hard disk drives 12 perpendicular to the front 13 of the rack 14. Other typical mounting configurations are shown in prior art FIGS. 2 and 3. FIG. 2 shows an example of a typical solid-state hard disk drive 22 mounted in a conventional rack 20 where the hard drive 22 is attached so that a long axis L2 of the hard disk drive is perpendicular to a front 23 of the mounting rack 24.

Because of the desire for multiple peripheral devices in computer systems, the industry is in need of a compact apparatus for the storage of peripheral devices such as hard disk drives. The need will continue to grow as networking systems continue to increase in size.

SUMMARY OF THE INVENTION

In one aspect, the invention relates to an apparatus for storing electronic devices comprising an enclosure, a carrier, and a rotatable connection between the carrier and the enclosure. The carrier is adapted to contain a peripheral device.

In some embodiments, the carrier may be rotated from an installed position to an open position. When in the installed position, a long axis of the carrier is substantially parallel to a front of the enclosure. When in the open position, the long axis of the carrier is substantially perpendicular to the front of the enclosure.

Other aspects and advantages of the invention will be apparent from the following description and the appended claims.

DETAILED DESCRIPTION OF THE INVENTION

Figure 1:
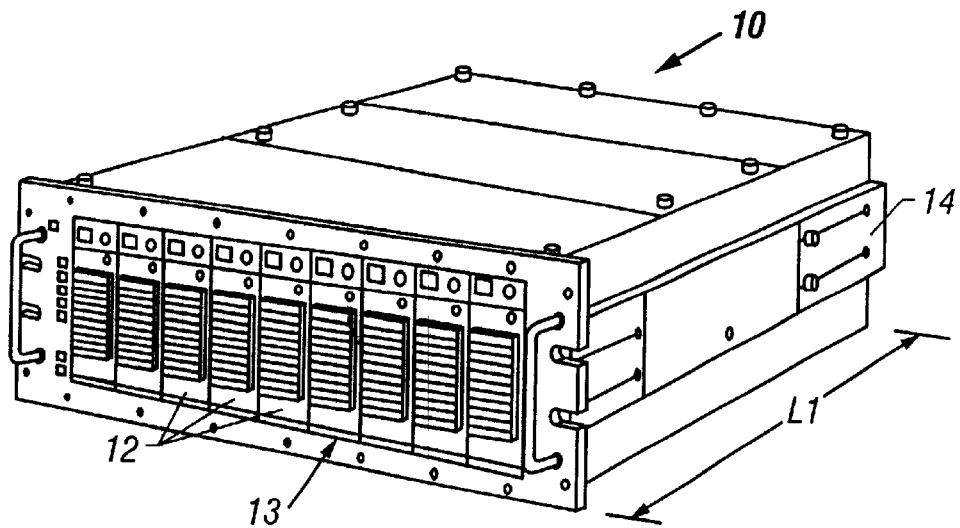
FIG. 1 shows an example of computer equipment mounted in a prior art peripheral storage rack.
Figure 2:
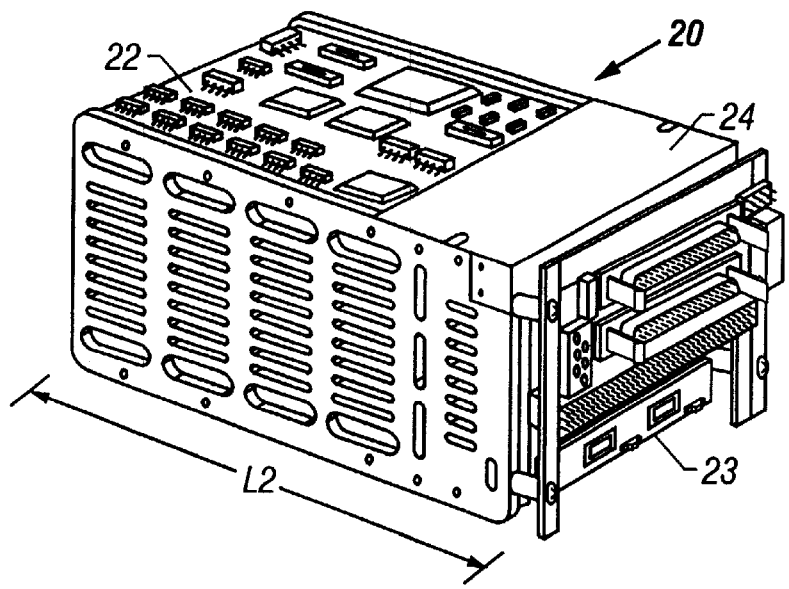
FIG. 2 shows an example of a prior art solid-state hard disk in a conventional storage rack.
Figure 3:
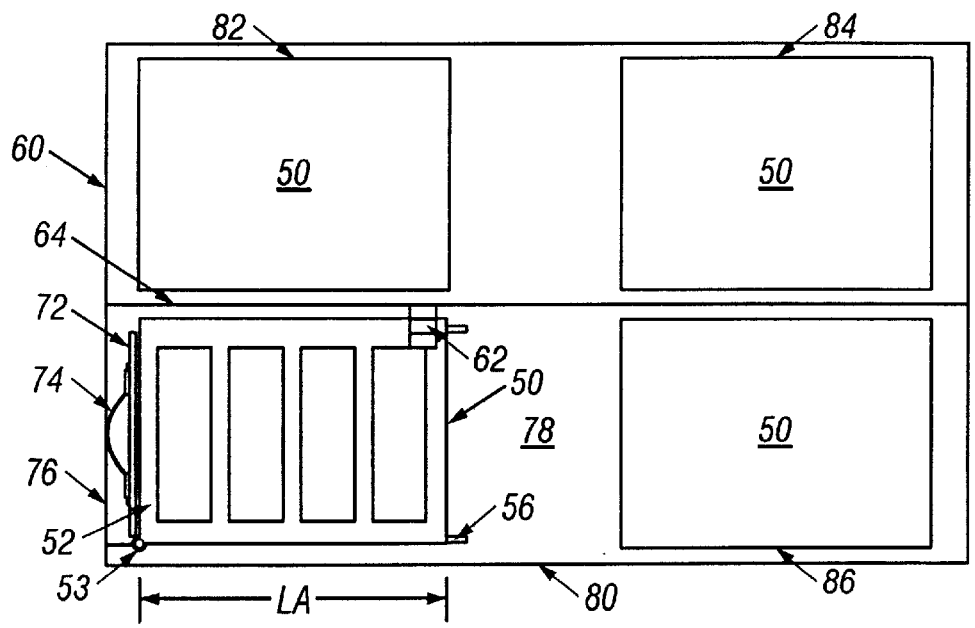
FIG. 3 shows a top view of an embodiment of the invention where a peripheral device is in an installed position.
Figure 4:
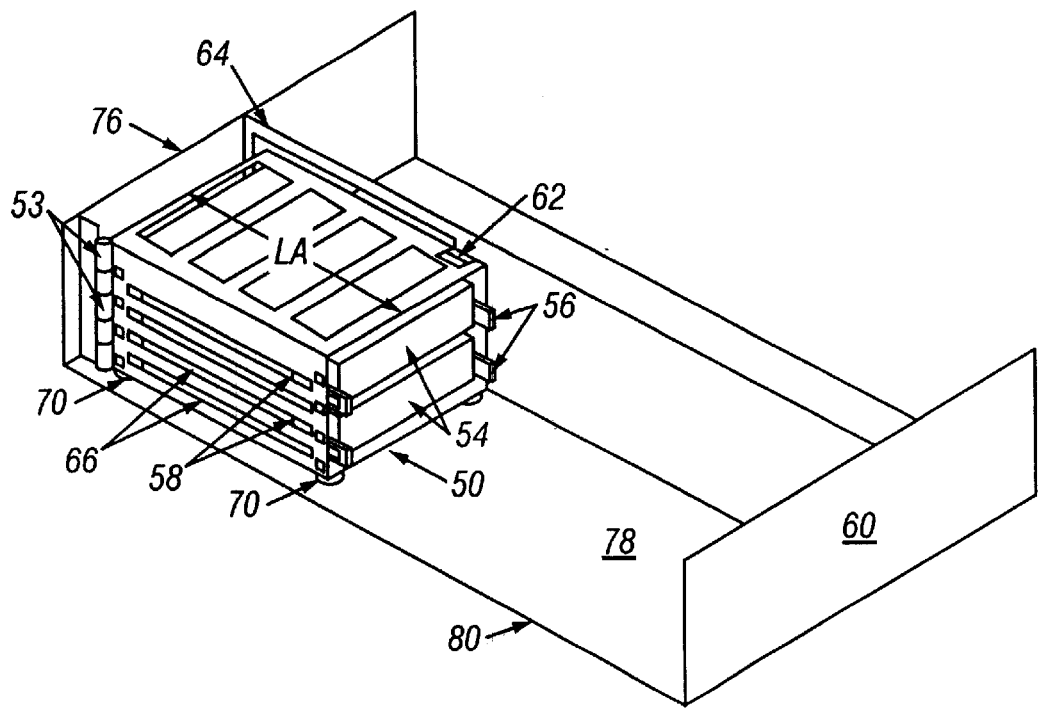
FIG. 4 shows a perspective view of an embodiment of the invention where a peripheral device is in an installed position.
Figure 5:
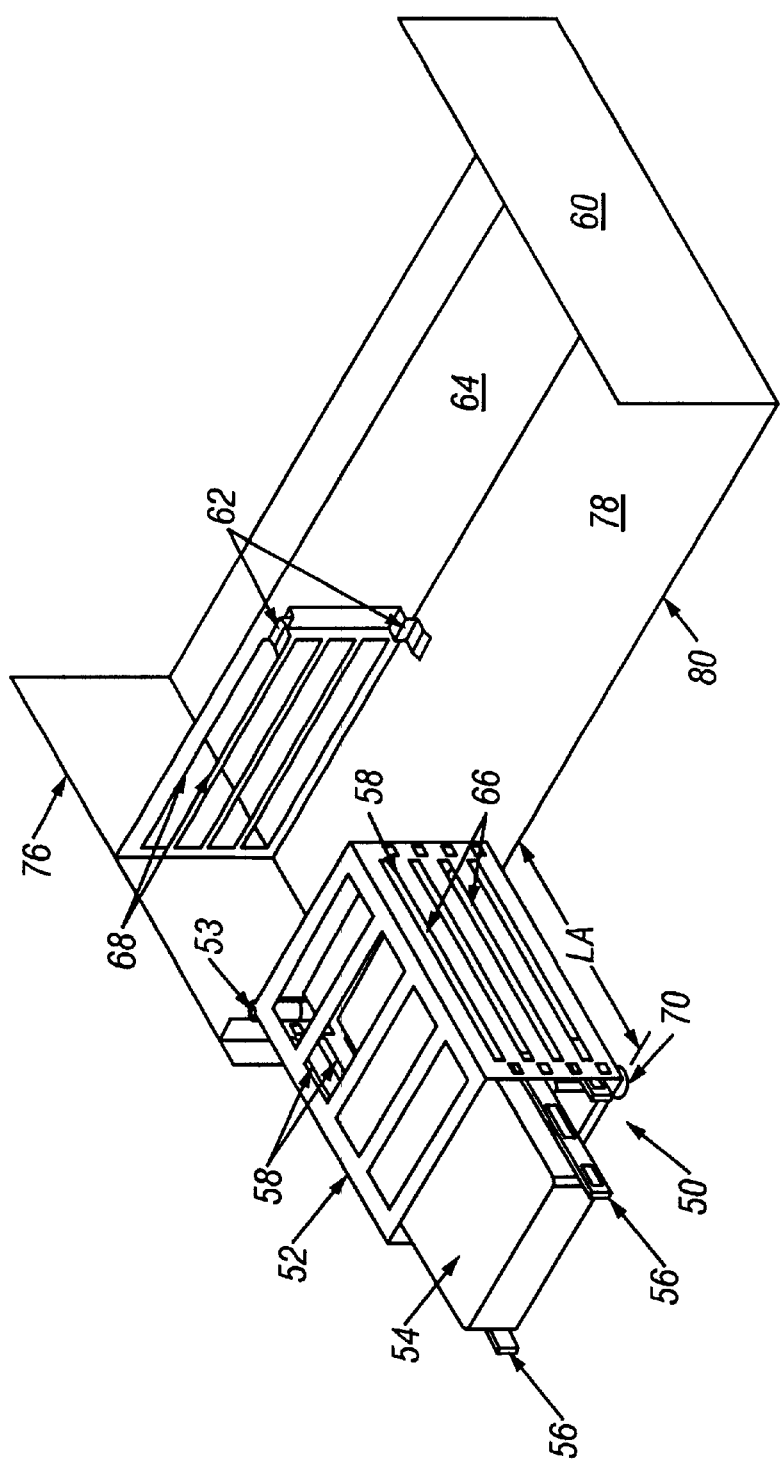
FIG. 5 shows an embodiment of the invention where a peripheral device is in an accessible position.

FIG. 3 shows a top view of an embodiment of the invention. The embodiments shown in FIGS. 3, 4, and 5 are intended to generally illustrate a mounting mechanism for electronic devices. FIGS. 4 and 5 show a detailed illustration of only a single peripheral device storage system 50 within an electronic system enclosure 60. However, as shown in FIG. 3, a plurality of peripheral device storage systems 50 may be mounted in the electronic system enclosure 60. The peripheral device storage system 50 and the electronic system enclosure 60 may be of a different size and/or shape. For example, the peripheral device storage system 50 may be adjusted to accommodate different types of peripheral devices 54. Further, the electronic system enclosure 60 may be larger or may contain a plurality of shelves to contain the peripheral device storage systems 50. The illustrations in the Figures are provided to clarify the invention and are not intended to limit the scope of the invention.

In the embodiment shown in FIGS. 3, 4, and 5, the peripheral device storage system 50 includes a carrier 52 and peripheral devices 54. The peripheral devices 54 may be, for example, disk drives, magnetic tape drives, or CD R/W (Compact Disk Read/Write) drives. However, the type of peripheral device is not intended to limit the scope of the invention. In one embodiment of the invention, the peripheral devices 54 are hard disk drives.

The carrier 52 may be rotatably attached to the electronic system enclosure 60 with a device such as a hinge 53. The hinge 53 may be any type of hinge known in the art. The hinge 53 may be either permanently or releasably attached to both the carrier 52 and to the electronic system enclosure 60. The electronic system enclosure 60 also includes a stiffener 64 that acts as a structural support for the electronic system enclosure 60. The stiffener 64 typically includes stiffener air vents 68 that may be formed in the stiffener 64 and located proximate the carrier 52.

The carrier 52 comprises a plurality of guide rails 56 and carrier air vents 66. The number of sets of guide rails 56 may typically correspond to the number of peripheral devices 54 contained in the carrier 52. For example, in the embodiment shown in FIG. 4, there are two sets of guide rails 56 and two peripheral devices 54. The guide rails 56 serve as structural supports for the carrier 52 and also serve as attachment points for sliding mechanisms 58. The guide rails 56 are releasably attached to the peripheral devices 54. The sliding mechanisms 58 permit the peripheral devices 54 to slide in and out of the carrier 52 so that they may be easily accessed or removed (as shown in FIG. 5). The guide rails 56 may be designed so that the peripheral devices 54 may be coupled to the guide rails 56 without mechanical fasteners such as screws or bolts. For example, the peripheral devices 54 may be removably attached to the guide rails 56 with quick-release fasteners such as spring connectors. If the peripheral devices 54 are coupled with quick-release fasteners, removal and reinstallation of the peripheral devices 54 is simplified. However, the use of any type of mechanical fastener is acceptable and is within the scope of the invention.

The carrier 52 may include a back plane 72. The back plane 72 includes electronic connectors (not shown) that mate with corresponding electronic connectors (not shown) on the peripheral devices 54. The electronic connectors provide power to the peripheral devices 54 through a connection with a power supply (not shown) and enable the peripheral devices 54 to transmit information to and from other computer hardware (not shown). The back plane 72 may also include an electromagnetic interference ("EMI") ground to prevent the peripheral devices 54 from being damaged by electromagnetic energy.

The carrier air vents 66 and the stiffener air vents 68 permit air to circulate proximate the peripheral devices 54. Air circulation acts to cool the peripheral devices 54 and prevents temperatures in the electronic system enclosure 60 from rising above acceptable levels. Moreover, the carrier air vents 66 and the stiffener air vents 68 provide openings for a forced circulation system. For example, cooling fans (not shown) may be included in the peripheral device storage system 50 to further control temperatures.

The hinge 53 permits the carrier 52 to rotate from an installed position (shown in FIGS. 3 and 4) to an access and removal position (as shown in FIG. 5). When the carrier 52 is in the installed position, the carrier 52 is releasably attached to the stiffener 64 by a device such as a positive stop latch 62. The positive stop latch 62 may be any latching or coupling device known in the art that will maintain the carrier 52 in the installed position.

Further, when in the installed position, a long axis LA of the peripheral devices 54 is substantially parallel to a front 80 of the electronic system enclosure 60. Having the long axis LA parallel to the front 80 of the electronic system enclosure 60 reduces the amount of office or storage space required for the peripheral device storage system 50. Moreover, a larger number of peripheral devices 54 may be stored in a comparable amount of space. For example, as shown in the embodiment of FIG. 3, a second carrier 82, a third carrier 84, and a fourth carrier 86 may be positioned in the electronic system enclosure 60.

The embodiments of the invention shown in FIGS. 3, 4, and 5 include a spring stop 74 that may be attached to the back plane 72 of the carrier 52. When the carrier 52 is in the installed position, the spring stop 74 may be slightly compressed to maintain a predetermined distance between the carrier 52 and a side 76 of the enclosure 60. Another function of the spring stop 74 is to act as a "shock absorbing" mechanism when the carrier 52 is moved from the removal position (as shown in FIG. 5) to the installed position (as shown in FIGS. 3 and 4). For example, the spring stop 74 may act to cushion the carrier 52 as it is rotated into the installed position so that the carrier 52 does not impact the side 76 of the electronic system enclosure 60. Excessive impact forces between the carrier 52 and the side 76 of the electronic system enclosure 60 could jar electronic components in the peripheral devices 54 and possibly cause damage or system errors. The spring stop 74 is not required for the peripheral device storage system 50 to function as intended. Alternative methods could be used to prevent the carrier 52 from impacting the side 76 of the electronic system enclosure 60. Therefore, the presence or absence of the spring stop 74 is not intended to limit the scope of the invention.

The carrier 52 may also include a plurality of pads 70 that are either permanently or releasably attached to a bottom of the carrier 52. The pads 70 may serve as a "gap filler" between the bottom of the carrier 52 and a bottom 78 of the electronic system enclosure 60. The pads 70 may serve as structural supports by transferring the weight of the carrier 52 and the peripheral devices 54 to the bottom of the enclosure 78. The load transfer is desirable because otherwise the full weight of the carrier 52 and the peripheral devices 54 may be supported by the hinge 53. The pads 70 may also serve as shock absorbers that absorb vibrations during shipment and operation. The pads 70 may be formed of a variety of materials (such as, for example, an elastomer) and may be provided with reduced friction coatings to prevent excessive friction between the pads 70 and the bottom 78 of the electronic system enclosure 60 when the carrier 52 is rotated to and from the installed position. The pads 70 may also accommodate tolerance stack-up in manufacturing, thereby easing manufacturing requirements and reducing the cost of the peripheral device storage system 50. Other embodiments of the invention may include additional structural supports, and the pads 70 and their material composition is not intended to limit the scope of the invention.

Further, the other structural components of the peripheral device storage system 50 may be made of different materials. For example, the carrier 52 may comprise metal, plastic, composite, or any combination thereof. The material composition of the elements of the peripheral device storage system 50 are not intended to limit the scope of the invention.

The invention is advantageous because it provides a space-maximizing mechanism by which peripheral devices 54 may be easily accessed and removed for service, replacement, or repair. The operator may then install or swap the peripheral devices 54 as needed. This is especially advantageous for applications such as "hot-swapping" where peripheral devices 54 may be added to or removed from the computer system while the system is still running (and the system typically immediately recognizes the change in hardware configuration). Further, a large number of peripheral devices 54 may be stored in a comparatively small amount of space. The use of less space may optimize the storage capacity of the computer system while minimizing system space.

Those skilled in the art will appreciate that other embodiments of the invention can be devised which do not depart from the spirit of the invention as disclosed herein. Accordingly, the scope of the invention should be limited only by the attached claims.

What is claimed is:

1. An apparatus for storing electronic devices comprising:
   an enclosure;

a carrier adapted to contain a peripheral device;

guide rails adapted to be releasably attached to the peripheral device;

sliding mechanisms attached to the guide rails and to the carrier; and a rotatable connection between the carrier and the enclosure.

2. The apparatus of claim 1, wherein the carrier may be rotated from an installed position to an open position.

3. The apparatus of claim 2, wherein a long axis of the carrier is substantially parallel to a front side of the enclosure when the carrier is in the installed position.

4. The apparatus of claim 2, wherein a long axis of the carrier is substantially perpendicular to a front side of the enclosure when the carrier is in the open position.

5. The apparatus of claim 1, further comprising a peripheral device releasably attached to the carrier.

6. The apparatus of claim 5, wherein a long axis of the peripheral device is substantially parallel to a long axis of the carrier.

7. The apparatus of claim 1, further comprising a plurality of carriers.

8. The apparatus of claim 7, wherein a plurality of peripheral devices are releasably attached to the plurality of carriers.

9. The apparatus of claim 1, wherein the rotatable connection comprises at least one hinge.

10. The apparatus of claim 1, wherein the rotatable connection is attached to a side edge of the enclosure.

11. The apparatus of claim 5, wherein the peripheral device comprises a hard disk drive.

12. The apparatus of claim 5, wherein the peripheral device comprises a magnetic tape drive.

13. The apparatus of claim 5, wherein the peripheral device comprises a CD R/W drive.

14. The apparatus of claim 1, wherein when the carrier is rotated to an open position, the peripheral device may slide on the sliding mechanisms relative to the carrier so that the peripheral device may be removed.

15. The apparatus of claim 1, wherein the carrier further comprises a back plane.

16. The apparatus of claim 15, wherein the back plane releasably engages a peripheral device.

17. The apparatus of claim 1, wherein the carrier further comprises a plurality of air vents.

18. The apparatus of claim 1, wherein the carrier further comprises a spring stop.

19. The apparatus of claim 18, wherein the spring stop is attached to the carrier proximate a back plane.

20. The apparatus of claim 1, wherein the enclosure further comprises:

a stiffener; and a plurality of air vents formed in the stiffener.

21. The apparatus of claim 20, wherein the carrier is releasably attached to the stiffener when in an installed position.

22. The apparatus of claim 1, wherein the carrier further comprises a plurality of pads located proximate a bottom of the carrier.

23. The apparatus of claim 22, wherein the plurality of pads further comprise a reduced friction coating.

24. The apparatus of claim 22, wherein the plurality of pads further comprise a shock absorbing material.

25. The apparatus of claim 24, wherein the shock absorbing material comprises an elastomer.

26. An apparatus for storing electronic devices comprising:

an enclosure;

a carrier adapted to contain a peripheral device, the carrier further comprising guide rails and sliding mechanisms attached to the guide rails and to the carrier;

a peripheral device releasably attached to the guide rails, the peripheral device arranged so that a long axis of the peripheral device is substantially parallel to a front of the enclosure when in an installed position; and a rotatable connection between the carrier and the enclosure.

27. An apparatus for storing electronic devices comprising:

an enclosure;

a carrier containing a peripheral device;

guide rails releasably attached to the peripheral device;

sliding mechanisms attached to the guide rails and to the carrier; and a rotatable connection between the carrier and the enclosure.

* * * * *